(12) United States Patent
Garduno Estebanez et al.

(10) Patent No.: US 10,941,536 B2
(45) Date of Patent: Mar. 9, 2021

(54) WIND TURBINE FOUNDATION

(71) Applicant: ACCIONA WINDPOWER, S.A., Navarra (ES)

(72) Inventors: Aitor Garduno Estebanez, Navarra (ES); Jose Luis Aristegui Lantero, Navarra (ES); Teresa Arlaban Gabeiras, Navarra (ES); Jose Miguel Garcia Sayes, Navarra (ES); Miguel Nunez Polo, Navarra (ES)

(73) Assignee: ACCIONA WINDPOWER, S.A., Barasoain (ES)

( * ) Notice: Subject to any disclaimer, the term of this patent is extended or adjusted under 35 U.S.C. 154(b) by 0 days.

(21) Appl. No.: 15/792,074

(22) Filed: Oct. 24, 2017

(65) Prior Publication Data

US 2018/0112371 A1 Apr. 26, 2018

(30) Foreign Application Priority Data

Oct. 24, 2016 (EP) .................................... 16382482

(51) Int. Cl.
*E02D 27/42* (2006.01)
*E04H 12/08* (2006.01)
*F03D 13/20* (2016.01)

(52) U.S. Cl.
CPC ......... *E02D 27/425* (2013.01); *E04H 12/085* (2013.01); *F03D 13/22* (2016.05); *F05B 2230/50* (2013.01); *Y02P 70/50* (2015.11)

(58) Field of Classification Search
CPC . E02D 27/425; E04H 12/085; F05B 2230/50; F03D 13/22

USPC ............................................................ 52/40
See application file for complete search history.

(56) References Cited

U.S. PATENT DOCUMENTS

| 678,273 | A | * | 7/1901 | Newell | ..................... | E02D 5/80 |
|---|---|---|---|---|---|---|
| | | | | | | 52/155 |
| 742,885 | A | * | 11/1903 | Martin | ..................... | E02D 27/02 |
| | | | | | | 52/292 |
| 943,550 | A | * | 12/1909 | Hughes | ................... | E04H 17/10 |
| | | | | | | 256/52 |
| 1,006,309 | A | * | 10/1911 | Spickerman | .............. | E01B 9/28 |
| | | | | | | 238/265 |
| 1,624,237 | A | * | 4/1927 | Hanna | ..................... | E04H 12/12 |
| | | | | | | 362/431 |

(Continued)

FOREIGN PATENT DOCUMENTS

CN 203452985 U 2/2014
CN 105002924 A * 10/2015

(Continued)

*Primary Examiner* — Patrick J Maestri
*Assistant Examiner* — Joseph J. Sadlon
(74) *Attorney, Agent, or Firm* — Lathrop GPM LLP (57) ABSTRACT

Wind turbine foundation (1) comprising an annular base plate (2) comprising a supporting surface (3) and defining a central hollow (4) by at least an inner lateral surface (6). The central hollow (4) further comprises a lower surface (5) arranged at a level lower than a level of the supporting surface (3). In particular, the central hollow (4) has a dimension (D), defined by the distance between at least an inner upper surface (10) and the lower surface (5), established such as to allocate additional equipment between both surfaces. A method of constructing said wind turbine foundation (1) is also described.

22 Claims, 6 Drawing Sheets

(56) References Cited

U.S. PATENT DOCUMENTS

| | | | | |
|---|---|---|---|---|
| 1,647,925 A * | 11/1927 | May | E02D 27/42 | 405/229 |
| 1,777,509 A * | 10/1930 | Underwood | E04H 12/12 | 362/431 |
| 2,948,995 A * | 8/1960 | Cogan | E04B 1/21 | 52/259 |
| 3,295,817 A * | 1/1967 | Carlsen | E02D 27/42 | 249/83 |
| 4,118,637 A * | 10/1978 | Tackett | F03D 7/06 | 290/55 |
| 4,134,707 A * | 1/1979 | Ewers | F03D 3/02 | 415/4.2 |
| 4,232,846 A * | 11/1980 | Bressani | F21V 21/10 | 248/158 |
| 4,406,094 A * | 9/1983 | Hempel | E02D 27/42 | 416/11 |
| 4,776,140 A * | 10/1988 | Wight | E02D 5/80 | 405/205 |
| 4,925,337 A * | 5/1990 | Spiess | E02D 29/1409 | 404/25 |
| 5,526,609 A * | 6/1996 | Lee | E04H 9/02 | 52/1 |
| 5,586,417 A * | 12/1996 | Henderson | E02D 27/42 | 405/233 |
| 5,680,731 A * | 10/1997 | Guy | E02D 27/32 | 248/188.2 |
| 6,448,668 B1 * | 9/2002 | Robitaille | B60K 16/00 | 290/54 |
| 6,457,913 B1 * | 10/2002 | Garten | E02D 27/00 | 249/191 |
| 6,685,399 B2 * | 2/2004 | Iemura | E02B 3/06 | 405/231 |
| 6,702,522 B2 * | 3/2004 | Silber | E02D 27/42 | 405/229 |
| 6,786,017 B2 * | 9/2004 | Thompson | E04B 2/7433 | 248/519 |
| 7,610,728 B1 * | 11/2009 | Manocchia | E02D 27/01 | 248/357 |
| 7,735,273 B2 * | 6/2010 | Knepp | E02D 5/38 | 405/229 |
| 7,805,895 B2 * | 10/2010 | Kristensen | E02D 27/42 | 52/169.6 |
| 8,051,627 B2 * | 11/2011 | Schiffer | E02D 27/42 | 52/296 |
| 8,148,837 B2 * | 4/2012 | Yoshida | F03D 80/60 | 290/44 |
| 8,383,933 B2 * | 2/2013 | Mogensen | H02G 13/00 | 174/2 |
| 8,468,776 B2 * | 6/2013 | Cortina-Ortega | F03D 13/20 | 52/843 |
| 8,615,965 B2 * | 12/2013 | Kryger | E04H 7/22 | 52/745.18 |
| 8,677,752 B2 * | 3/2014 | DuBois | F03G 6/045 | 60/641.2 |
| 8,876,486 B2 * | 11/2014 | Tosello | E02D 27/42 | 416/246 |
| 8,887,451 B2 * | 11/2014 | Gregory | E04G 23/065 | 405/232 |
| 8,919,051 B1 * | 12/2014 | Echemendia | E04H 12/08 | 52/146 |
| 9,021,757 B2 * | 5/2015 | Hangel | B66C 1/66 | 52/295 |
| 9,032,674 B2 * | 5/2015 | Schibsbye | E02D 27/42 | 52/223.4 |
| 9,175,493 B2 * | 11/2015 | Zavitz | E04H 12/185 | |
| 9,682,846 B2 * | 6/2017 | Mathiasen | F03D 80/88 | |
| 9,689,175 B2 * | 6/2017 | Zavitz | E04H 12/16 | |
| 9,745,770 B2 * | 8/2017 | Kirkley | E04H 12/342 | |
| 10,024,306 B2 * | 7/2018 | Kirkley | E04C 5/08 | |
| 10,107,265 B2 * | 10/2018 | Lafferty | E02D 27/42 | |
| 10,132,296 B2 * | 11/2018 | Garcia Maestre | F03D 13/20 | |
| 10,309,074 B2 * | 6/2019 | Tozer | E02D 27/016 | |
| 10,378,173 B2 * | 8/2019 | Sevoz | E02D 5/50 | |
| 10,443,205 B2 * | 10/2019 | Menzel | E02D 27/50 | |
| 10,513,833 B2 * | 12/2019 | Phuly | E02B 17/025 | |
| 10,519,685 B2 * | 12/2019 | Viselli | E04H 12/341 | |
| 2002/0092262 A1 * | 7/2002 | Schlusselbauer | B28B 21/76 | 52/745.19 |
| 2002/0124502 A1 * | 9/2002 | Henderson | E02D 27/42 | 52/296 |
| 2007/0251187 A1 * | 11/2007 | Schiffer | E02D 27/42 | 52/741.14 |
| 2008/0190058 A1 * | 8/2008 | Migliore | E02D 27/42 | 52/295 |
| 2010/0066094 A1 * | 3/2010 | Bernhoff | E02D 27/42 | 290/55 |
| 2010/0095617 A1 * | 4/2010 | Scholte-Wassink | F03D 80/00 | 52/296 |
| 2010/0123317 A1 * | 5/2010 | Leijon | F03D 3/005 | 290/55 |
| 2011/0131899 A1 * | 6/2011 | Voss | E02D 27/42 | 52/173.1 |
| 2012/0011801 A1 | 1/2012 | Schiffer et al. | | |
| 2012/0260592 A1 * | 10/2012 | Wolf | F03D 13/22 | 52/296 |
| 2012/0266552 A1 * | 10/2012 | Huynh Tong | E04H 12/16 | 52/223.4 |
| 2014/0318033 A1 * | 10/2014 | Coordes | E02D 27/42 | 52/40 |
| 2015/0143765 A1 * | 5/2015 | Carril Gonzalez | E02D 27/425 | 52/296 |
| 2016/0108600 A1 * | 4/2016 | Menzel | E02D 27/425 | 52/223.13 |
| 2016/0169209 A1 * | 6/2016 | Coordes | E04H 12/16 | 52/169.13 |
| 2016/0312431 A1 * | 10/2016 | Coordes | E04H 12/08 | |
| 2018/0112371 A1 * | 4/2018 | Garduno Estebanez | E04H 12/085 | |
| 2019/0084183 A1 * | 3/2019 | Phuly | E02D 27/425 | |

FOREIGN PATENT DOCUMENTS

| | | | | |
|---|---|---|---|---|
| CN | 105002924 A | | 10/2015 | |
| CN | 105297766 A | * | 2/2016 | |
| CN | 105297766 A | | 2/2016 | |
| DE | 202015100932 U1 | * | 6/2015 | E02D 27/425 |
| EP | 2182209 A2 | * | 5/2010 | E04H 12/12 |
| EP | 2653715 A1 | * | 10/2013 | E04H 12/085 |
| EP | 2738322 A1 | * | 6/2014 | E02D 27/425 |
| JP | 02304120 A | * | 12/1990 | E04H 12/085 |
| WO | WO-2015061862 A1 | * | 5/2015 | E02D 27/42 |

* cited by examiner

WIND TURBINE FOUNDATION

CROSS-REFERENCE TO RELATED APPLICATION AND PRIORITY

This patent application claims priority from European Patent Application No. 16382482.4 filed on Oct. 24, 2016, which is herein incorporated by reference in its entirety.

OBJECT OF THE INVENTION

The present invention relates to a foundation and is enclosed in the technical field of wind turbines.

More specifically, the present invention discloses a wind turbine foundation which allows a reduced use of materials for its construction.

BACKGROUND OF THE INVENTION

The goal of wind energy consists of generating electricity from wind through wind turbines with maximum efficiency and minimum cost. Wind turbines comprise basically a tower, a nacelle that houses the drive train and the electric generator, and a rotor comprising usually at least two blades.

The tower supports the rotor and the nacelle and transmits the loads to the foundation. In turn, the foundation is in charge of transferring the loads from the tower to the ground.

Depending on the kind of soil (according to its bearing capacity, mainly) foundations can be designed differently and therefore be classified into shallow, half-deep and deep.

In terms of geometry, foundations can be shaped differently although frustoconicals with a circular, hexa or even octagonal shape are the most common. They can also be solid or hollow (annular), being the difference between them that the latter ones comprise a central hollow in a zone where foundation materials are not necessary for load transmission. The use of materials for its construction, namely concrete and steel, is therefore reduced in hollow foundations with regards to solid ones.

All of these foundations are suitable for wind turbine towers made out of steel or concrete. The latter ones usually have some post-tensioning strands whose ends are fastened to the foundation. The connection of the ends of the strands to the foundation can differ depending on the type of foundation.

DESCRIPTION OF THE INVENTION

The wind turbine foundation of the present invention allows minimizing the amount of material used in the foundation while fulfilling structural requirements. This solution provides a hollow foundation with an optimized structural design that enables reducing costs.

The foundation of the present invention comprises a supporting surface (which is a surface that transmits the loads from the foundation to the soil where the foundation lies), an annular base plate and a central hollow bounded by the inner lateral surface of the annular base plate.

Said central hollow additionally protrudes downwardly from the inner lateral surface and the foundation further comprising a lower surface, which limits downwardly the hollow. The lower surface is arranged at a level lower than the supporting surface of the annular base plate in such a way that the depth of said hollow is at least enough to place additional equipment. This additional equipment can be a post-tensioning device for the strands of the wind turbine tower, electric equipment, etc.

The design of hollow foundations is constrained by the space needed by the additional equipment to be placed in the central hollow thus making the total height of the foundation higher than strictly necessary regarding structural requirements. This involves a bigger and non-optimized foundation, making it more expensive.

Consequently, the foundation is configured such that the total height of the annular base plate is the minimum height to fulfill the structural requirements of the foundation whereas the required space for additional equipment is provided. Said additional equipment can be placed in the central hollow of the foundation without protruding from the upper surface of the foundation and still avoiding the use of additional material for the foundation. This is especially advantageous in the cases in which the hollow foundation is to be used in wind turbine towers with post-tensioning strands. In these cases the required space for fitting post-tensioning equipment is achieved without adding height (and thus, without adding more material) to the foundation.

In contrast, the design of state-of-the-art hollow foundations includes the supporting surface and the lower surface at the same level. As their design is constrained by the space needed by the additional equipment that needs to be placed in the central hollow, this makes the total height of the foundation bigger than strictly necessary regarding the structural requirements posed by the loads that need to be transferred from the wind turbine tower to the soil through the foundation. This involves a bigger and non-optimized foundation that requires more material for its construction, making it more expensive.

In particular, the central hollow has a dimension, defined by the distance between at least an inner upper surface and the lower surface, established such as to allocate additional equipment between both surfaces, i.e. between the inner upper surface and the lower surface.

In an embodiment of the invention the central hollow of the foundation comprises a perimeter wall reinforcement to support the ground pressure towards the central hollow below the level of the supporting surface.

In another possible embodiment the foundation comprises sealing elements, designed to prevent water from entering the central hollow.

In a further embodiment of the invention, the foundation comprises both the perimeter wall reinforcement and the sealing elements.

In the cases in which the foundation is meant to be support concrete wind turbine towers and in a particular embodiment, the foundation comprises a plurality of protrusions protruding from the lateral surface in an upper section of the central hollow for attaching at least one post-tensioning strand-end. In this case, the at least an inner upper surface is provided in the lower part of the protrusions such that the dimension defined by the distance between at least an inner upper surface and the lower surface is established by the dimensions of the protrusions.

In another embodiment the foundation comprises recesses in an inner lateral surface of the central hollow of the foundation. In this case, the at least an inner upper surface is provided in the upper part of the recesses such that the dimension defined by the distance between at least an inner upper surface and the lower surface is established by the dimensions of the recesses.

A further embodiment of the invention provides that the foundation comprises a crown protruding from the lateral surface in an upper section of the central hollow for attaching at least one post-tensioning strand-end. In this case, the at least an inner upper surface is provided in the lower part of the crown such that the dimension defined by the distance between at least an inner upper surface and the lower surface and is therefore established by the dimensions of the crown.

In hollow foundations, the ends of the strands are usually fastened directly to the foundation towards a postensioning surface located in the at least an inner upper surface. Some transitions are usually provided between the ends of the strands and the posttensioning surface such as to better transmit the loads.

Commonly the post-tensioning of the strands is performed through the strands-ends located nearest to the tower base, and a free space to introduce, temporarily, a post-tensioning device (generally jacks) must be considered when designing the foundation. This free space is provided in the present invention by configuring the foundation with distance between the inner upper surface and the lower surface being sufficient to allocate such equipment.

It is also an object of the present invention a method for the construction of a wind turbine foundation. The method comprises at least the following steps:
i) digging a foundation trench in two levels where a first level corresponds to the supporting surface and the second level, which is deeper than the first level, corresponds to the lower surface;
ii) pouring concrete on the surface of the second level of the ground to build the lower surface;
iii) formworking a perimeter wall of the central hollow of the foundation, pouring concrete in the formwork until reaching the first level and filling a gap between an outer surface of the perimeter wall and the ground in order to have a continuous horizontal surface;
iv) placing formworks and pouring concrete to build the rest of the foundation, i.e. the annular base plate;
v) removing the formworks.

In a further embodiment, the method also comprises an intermediate step a) between steps i) and ii) of placing a sealing element. In a still further embodiment, the method also comprises an intermediate step b) between steps ii) and iii) of formworking a perimeter wall reinforcement and pouring concrete in the formwork until reaching the first level.

DESCRIPTION OF THE DRAWINGS

To complement the description being made and in order to aid towards a better understanding of the characteristics of the invention, in accordance with a plurality of practical embodiments thereof, a set of drawings is attached as an integral part of said description wherein, with illustrative and non-limiting character, the following has been represented.

PREFERRED EMBODIMENT OF THE INVENTION

The present invention proposes wind turbine hollow foundation that, with less material than the hollow foundations of the state of the art, fulfills the same structural requirements. In the present invention, the height (H) of the hollow foundation is lower than the height (h) of the foundations of the state of the art for the same dimension (D) which is the distance left for fitting additional equipment within the hollow of the foundation.

Figure 1:
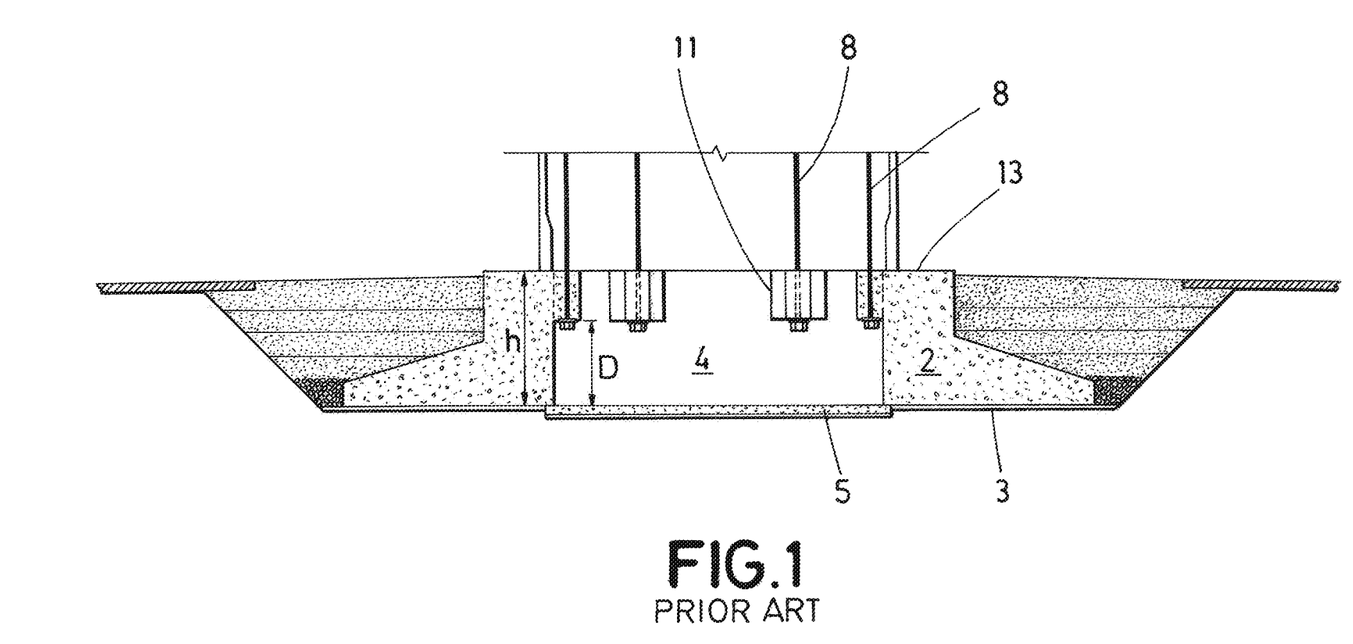
FIG. 1.—Shows a wind turbine foundation of the state of the art.

In FIG. 1 a state of the art hollow foundation can be appreciated. As it can be seen, there is a minimum dimension (D) within the hollow defined by the distance between an inner upper surface (10) and a lower surface (5) located at the same level of a supporting surface, that is provided for fitting additional equipment of the wind turbine within both surfaces. These geometrical features of the state of the art foundation entail a certain height (H) for the annular base plate (2) of the foundation.

In an embodiment, the dimension (D) of the central hollow (4) allows allocating post-tensioning equipment and performing post-tensioning operations of the strands of a wind turbine tower. So the dimension (D) of the central hollow (4) is fixed by the dimensions and required space for performing a post-tensioning stage of the strands of the tower, being in such a case a concrete tower.

Figure 2:
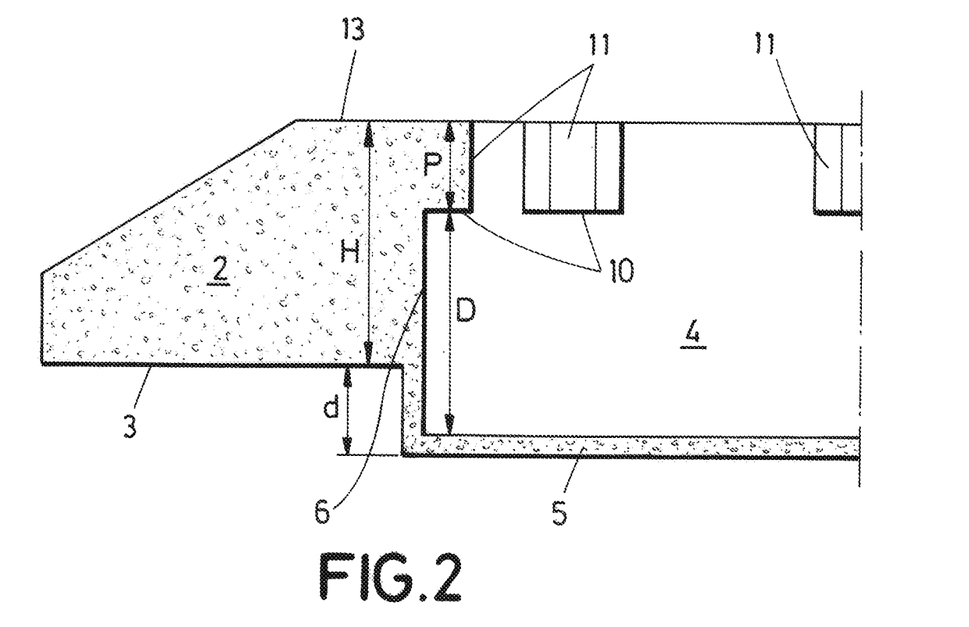
FIG. 2.—Shows a first embodiment of the wind turbine foundation.
Figure 3:
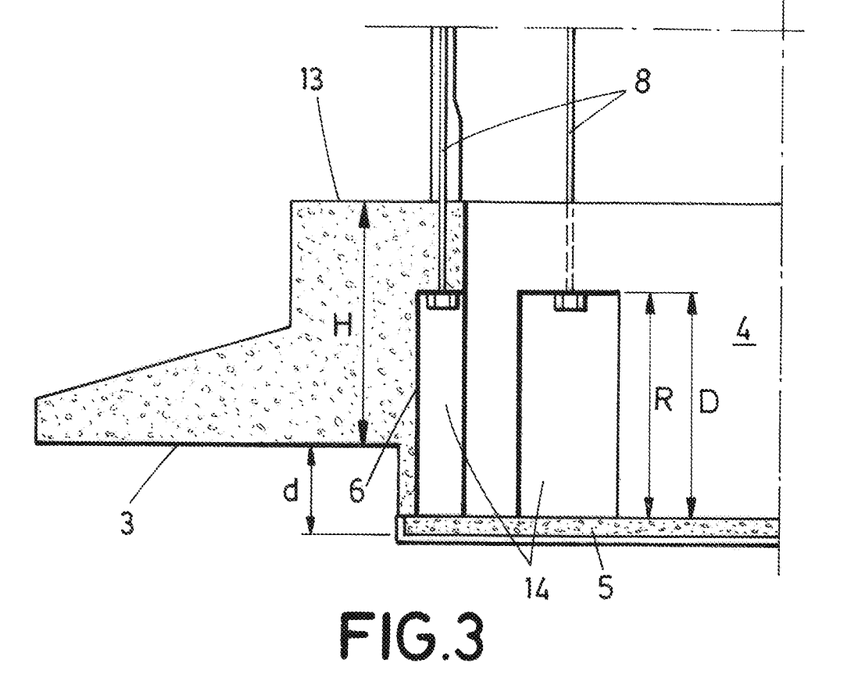
FIG. 3.—Shows a second embodiment of the wind turbine foundation.
Figure 4:
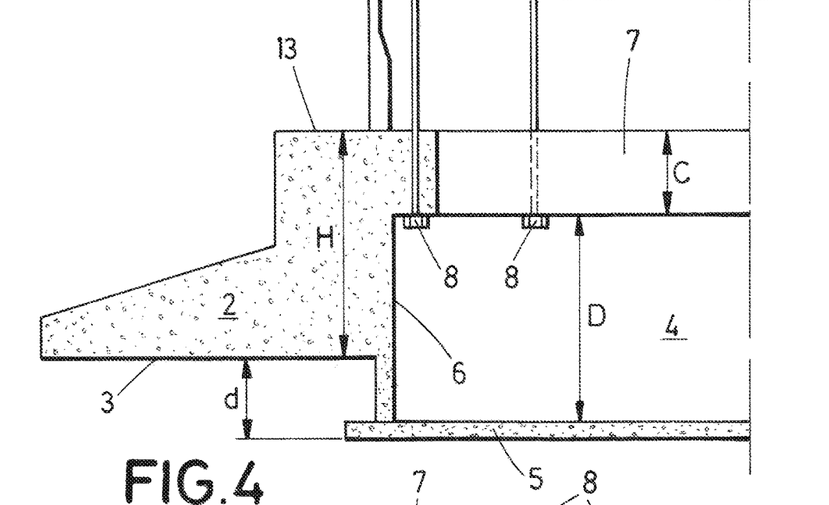
FIG. 4.—Shows a third embodiment of the wind turbine foundation.

In FIGS. 2, 3 and 4 different embodiments of the wind turbine foundation of the present invention are shown. The foundation (1) comprises an annular base plate (2), preferably of reinforced concrete comprising at least an inner lateral surface (6) defining a central hollow (4) and a supporting surface (3) which transmits the loads of the wind turbine to the ground.

In the present invention the central hollow (4) further comprises a lower surface (5) arranged at a level lower than a level of the supporting surface (3).

The central hollow (4) has a dimension (D) defined by the distance between at least an inner upper surface (10) and the lower surface (5), established such as to allocate additional equipment between both surfaces.

The distance between the lower surface (5) of the central hollow (4) and the inner upper surface (10) is greater than a minimum dimension (D) enough to fit additional equipment In an embodiment of the invention in which the foundation supports a concrete tower, the dimension (D) of the central hollow (4) defined by the distance between at least an inner upper surface (10) and the lower surface (5), is established such as to allocate post-tensioning equipment between both surfaces, wherein the inner upper surface (10) is the post-tensioning surface configured such as to attach at least one post-tensioning strand-end.

Current state-of-the-art foundations comprise the supporting surface (3) and the lower surface (5) at the same level so that the minimum distance for fitting or installing additional equipment is achieved by increasing the height (H) of the annular base plate (2) further than required by the loads that the foundation needs to transmit to the ground. Therefore, state of the art foundations entail greater dimensions than the foundation of the present invention (i.e. (h>H) being (h) the height of the foundations of the state of the art as represented in FIG. 1). In FIGS. 2 to 5 the height (H) of the proposed hollow foundation can be appreciated. For the construction of a wind turbine foundation a plurality of materials is used, reinforcing steel and concrete being the most critical ones for an efficient transmission of the loads of the wind turbine to the ground. With the foundation of the present invention, a reduced use of such materials is achieved as the material that is not strictly necessary for supporting the loads bear by the wind turbine, being those loads driven to the foundation via the wind turbine tower, is not used.

In a preferred embodiment of the invention, the wind turbine hollow foundation additionally comprises a perimeter wall reinforcement (9) arranged in the central hollow (4) between at least the supporting surface (3) and the lower surface (5) in order to support the pressure exerted by the ground surrounding the hollow.

In FIG. 2 a first embodiment of the invention is shown in which the foundation (1) comprises a plurality of protrusions (11) protruding from the inner lateral surface (6) in an upper section of the central hollow (4) for attaching at least one post-tensioning strand-end (8). The protrusions (11) comprise the at least inner upper surface (10) in the surface of the protrusions (11) that faces downwardly the lower surface (5).

This embodiment is the preferred embodiment since is the solution that requires less material for its construction even though the loads that need to be transferred to the ground are the same, and consequently allows reducing the cost of the foundation compared to the solutions of the other embodiments.

In such an embodiment, the dimension (D) of the central hollow (4) defined by the distance between at least an inner upper surface (10) and the lower surface (5) is established by the dimensions of the protrusions (11). The height of the foundation (H) plus a distance (d) between the supporting surface (3) and the lower surface (5) minus the protrusions height (P) defines approximately the dimension (D) of the central hollow (4).

In FIG. 3 a second embodiment of the invention is shown. In this case, the foundation (1) comprises recesses (14) in the inner lateral surface (6) of the central hollow (4) extending between the lower surface (5) and an inner upper surface (10), which corresponds to the upper surface of the recess (14). In this case, the dimension (D) of the central hollow (4) defined by the distance between at least an inner upper surface (10) and the lower surface (5) is established by a recesses height (R).

As represented in FIG. 4, a third embodiment of the invention is shown. The wind turbine hollow foundation (1) additionally comprises at least a crown (7), i.e. an annular protrusion (7) protruding from the lateral surface (6) in an upper section of the central hollow. In an embodiment of the invention the crown (7) can be a post-tensioning crown configured to receive and attach at least one post-tensioning strand end (8) of the concrete wind turbine tower. The at least an inner upper surface (10) is, in this case, the surface of the tensioning crown (7) that faces downwardly the lower surface (5). In such an embodiment, the dimension (D) is defined by the distance between at least an inner upper surface (10) and the lower surface (5) and is stablished by the the dimensions of the crown (7).

Figure 5:
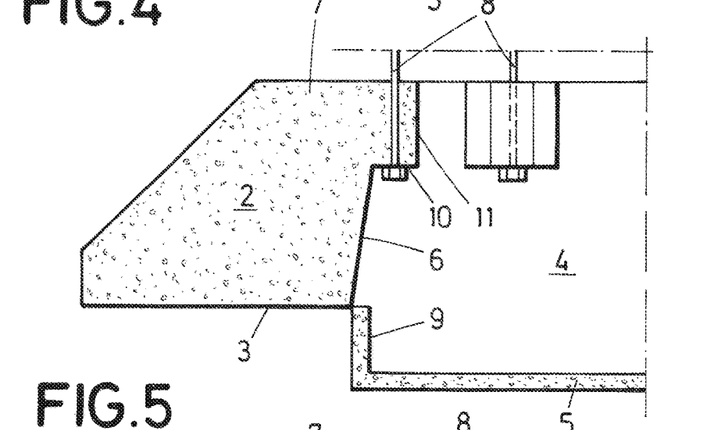
FIG. 5.—Shows an embodiment of the wind turbine foundation in which the inner lateral surface is not parallel to a perimeter wall reinforcement.

In another embodiment of the invention, shown in FIG. 5, the inner lateral surface (6) is not parallel to the internal surface of the perimeter wall reinforcement (9).

Figure 6:
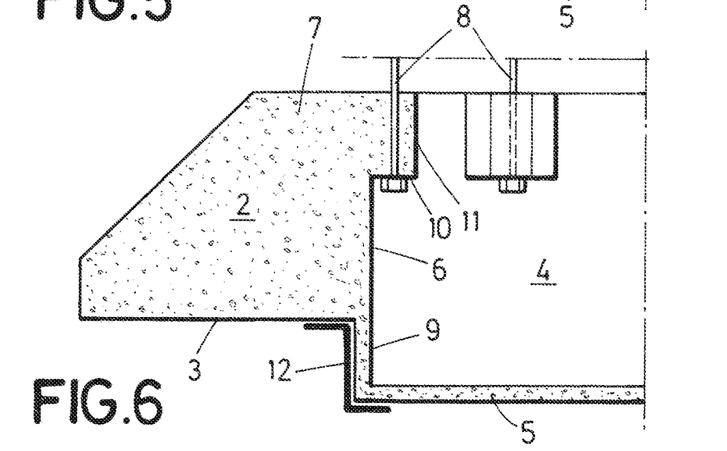
FIG. 6.—Shows an embodiment of the wind turbine foundation comprising at least a sealing element.

In another embodiment of the invention, shown in FIG. 6, the foundation additionally comprises sealing elements (12), located in the lower surface (5), preferably disposed between the ground and the central hollow (4) in order to prevent the water from entering said central hollow (4). In a preferred embodiment of the invention in which the foundation comprises perimeter wall reinforcement (9), the sealing elements (12) are placed between the ground and the perimeter wall reinforcement (9), surrounding said perimeter wall reinforcement (9). The sealing elements (12) can also cover, at least partially, the lower surface (5) and/or the supporting surface (3). Specifically the sealing elements (12) comprise a watertight layer.

Figure 7A:
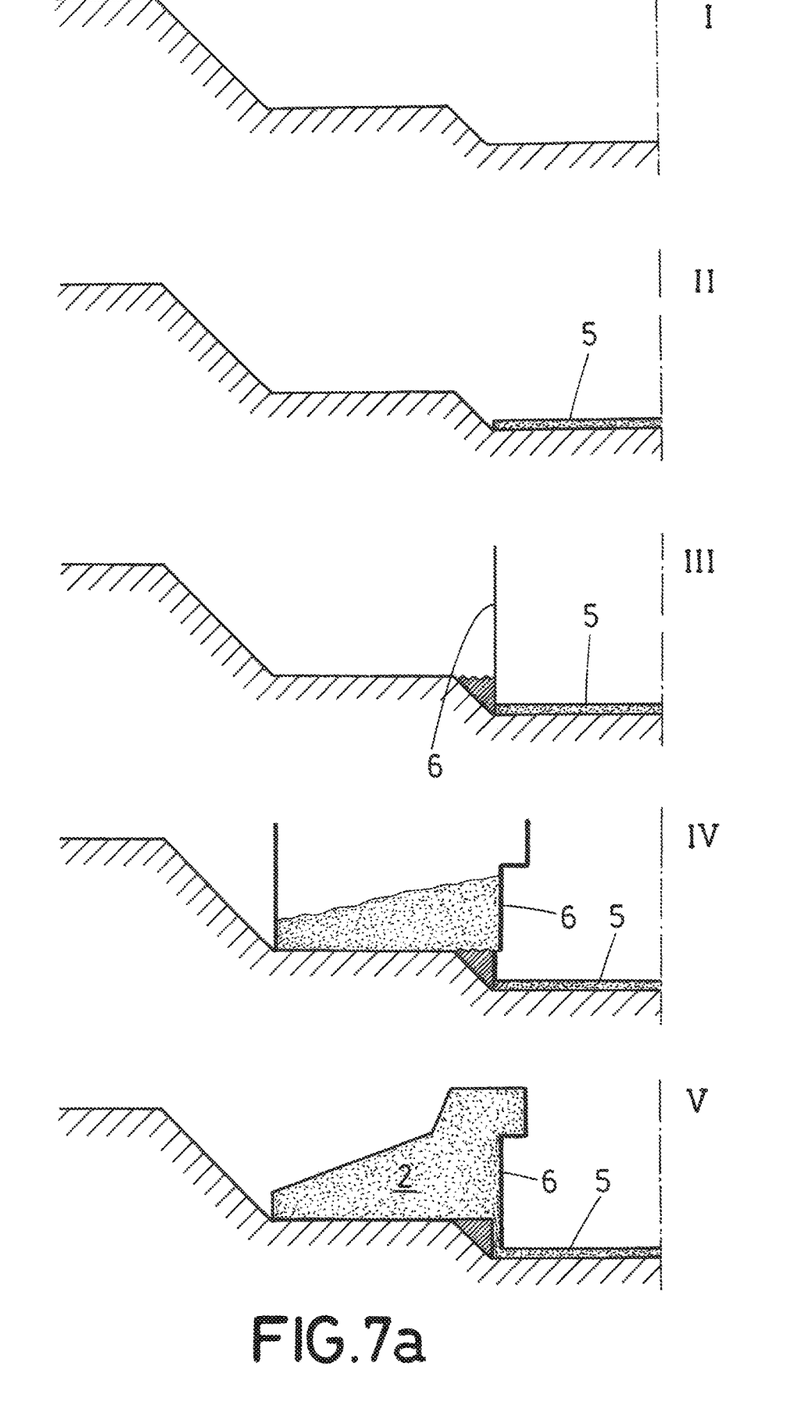
FIG. 7a.—Shows the steps of the method for the construction of a wind turbine foundation according to an embodiment of the invention with the inner lateral surface perpendicular to the lower surface of the central hollow.
Figure 7B:
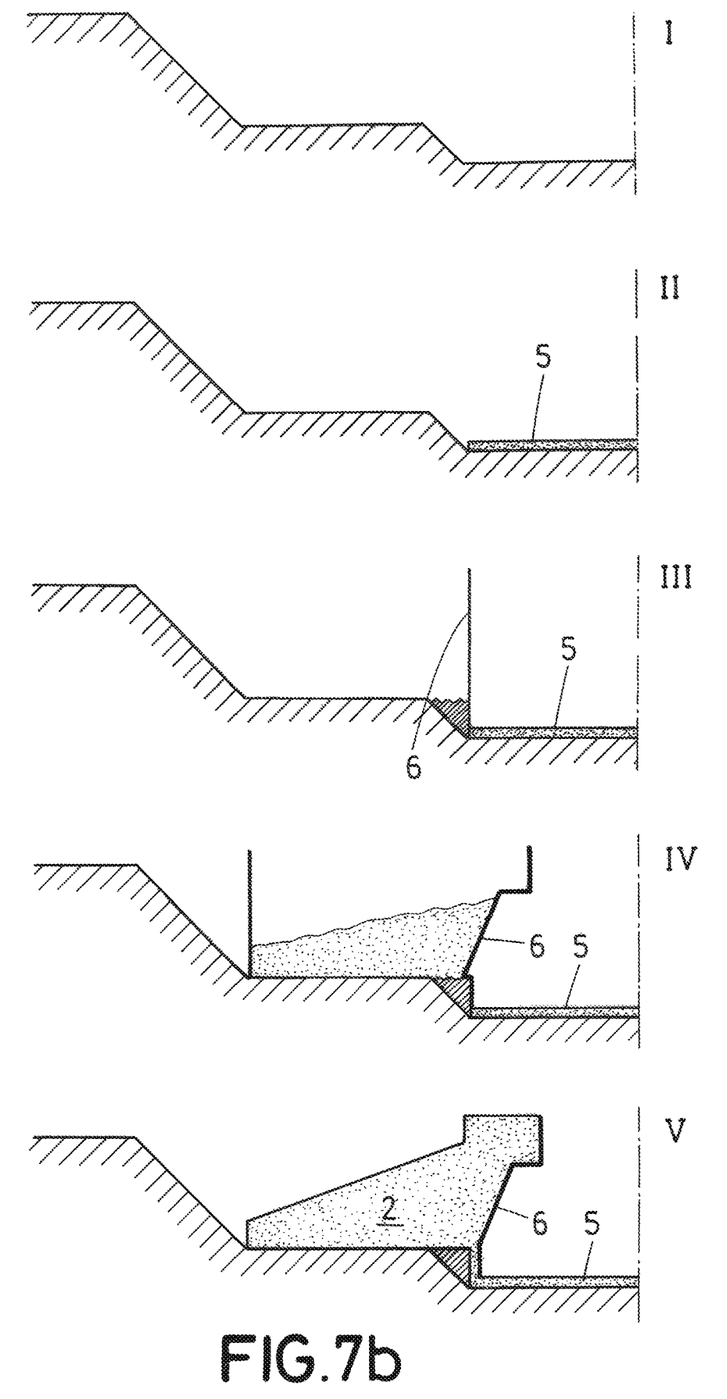
FIG. 7b.—Shows the steps of the method for the construction of a wind turbine foundation according to an embodiment of the invention with the inner lateral surface which are not parallel to the perimeter wall reinforcement.

It is also an object of the present invention the method for the construction of a foundation for wind turbines as shown in FIGS. 7a and 7b. The method comprises the following steps:

i) digging a foundation trench in two levels where a first level corresponds to the supporting surface (3) and the second level, which is deeper than the first level, corresponds to the lower surface (5);
ii) pouring concrete on the surface of the second level of the ground to build the lower surface (5);
iii) formworking a perimeter wall of the central hollow of the foundation, pouring concrete in the formwork until reaching the first level and filling with material a gap between an outer surface of the perimeter wall and the ground in order to have a continuous horizontal surface;
iv) placing formworks and pouring concrete to build the rest of the foundation;
v) removing the formworks.

In FIG. 7a the method of building a hollow foundation with inner lateral surface (6) perpendicular to the lower surface (5) is shown. In FIG. 7b the method of building a hollow foundation with the inner lateral surface (6) not perpendicular to the lower surface (5) is shown.

Figure 8:
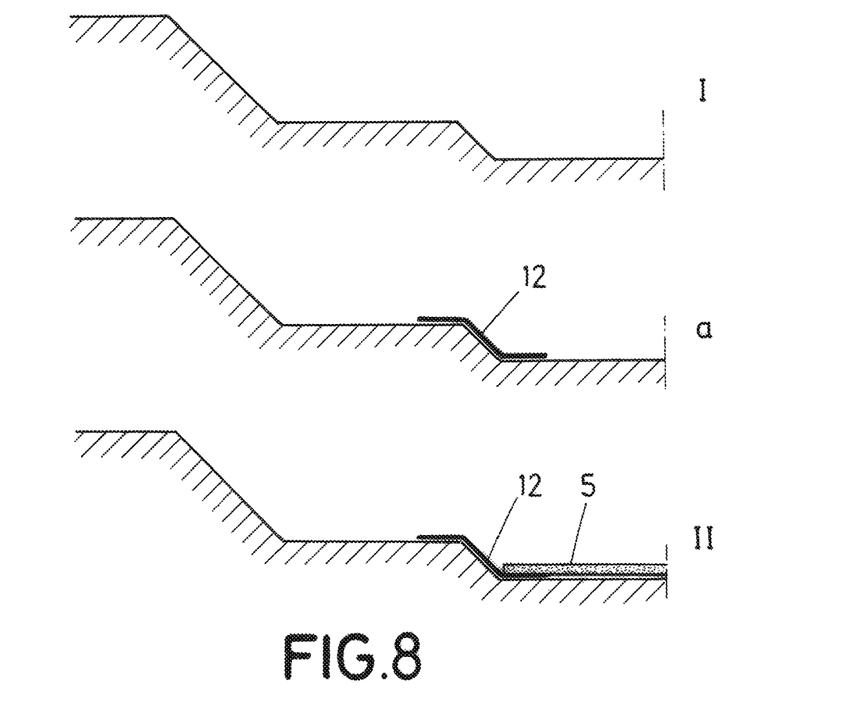
FIG. 8.—Shows an embodiment of the method additionally comprising a step of placing a sealing element.

In an embodiment of the invention, in which the hollow foundation comprises a sealing element (12), there is an intermediate step a) of placing a sealing element (12) between steps i) and ii). This can be seen in FIG. 8.

Figure 9:
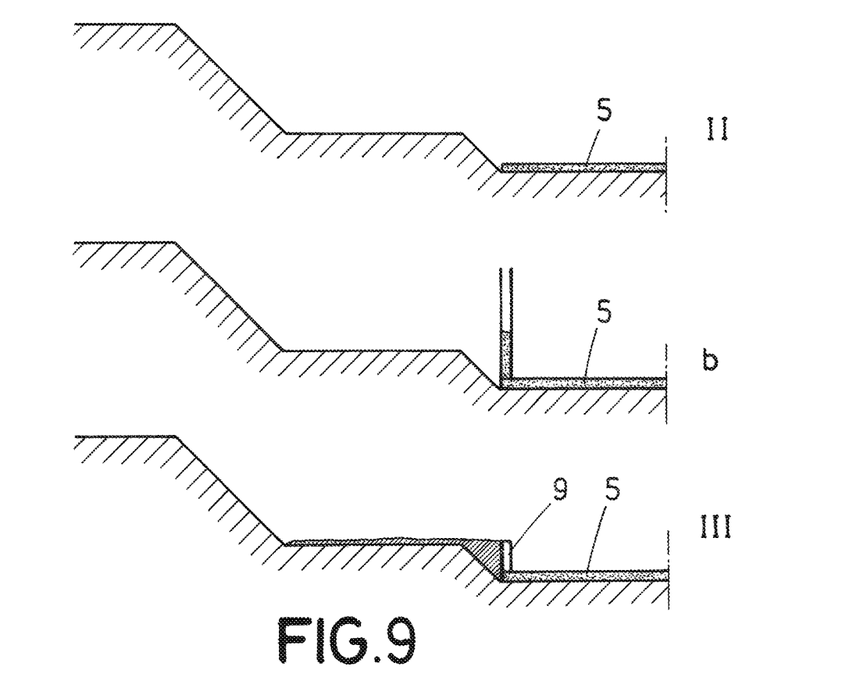
FIG. 9.—Shows an embodiment of the method additionally comprising a step of building a perimeter wall reinforcement.

In another embodiment of the invention, in which the hollow foundation comprises perimeter wall reinforcement (9), there is an intermediate step b) of formworking the perimeter wall reinforcement (9) and pouring concrete in the formwork until reaching the first level between the steps ii) and iii). This can be seen in FIG. 9.

The invention claimed is:
1. Wind turbine foundation comprising:
   an annular base plate comprising
      a supporting bottom surface of the annular base plate, wherein the supporting bottom surface transmits loads from the wind turbine foundation to a soil where the wind turbine foundation lies, and
      an inner lateral surface, wherein the inner lateral surface extends below the supporting bottom surface and defines a central hollow,
   wherein the central hollow further comprises a lower surface arranged at a level lower than a level of the supporting bottom surface, and
   wherein the central hollow protrudes downwardly below the supporting bottom surface.
2. The wind turbine foundation of claim 1 wherein the central hollow has a dimension, defined by a distance between at least one inner upper surface and the lower surface configured such as to allocate additional equipment between both surfaces.

3. The wind turbine foundation of claim 2 wherein the dimension allows allocating post-tensioning equipment and performing post-tensioning operations of strands of a wind turbine tower.

4. The wind turbine foundation of claim 2 further comprising protrusions placed in an upper section of the central hollow, protruding from the inner lateral surface, which comprise the at least one inner upper surface in the surface of the protrusions facing downwardly towards the lower surface.

5. The wind turbine foundation of claim 4 wherein the dimension of the central hollow is established by the dimensions of the protrusions in such a way that the height of the foundation plus a distance between the supporting bottom surface and the lower surface minus the protrusions height defines the dimension of the central hollow.

6. The wind turbine foundation of claim 2 further comprising recesses in the inner lateral surface and which comprise the at least one inner upper surface in the surface of the recesses facing downwardly towards the lower surface.

7. The wind turbine foundation of claim 6 wherein the dimension of the central hollow defined by the distance between at least an inner upper surface and the lower surface is established by a recesses height.

8. The wind turbine foundation of claim 2 further comprising at least a crown which comprises the at least one inner upper surface.

9. The wind turbine foundation of claim 8 wherein the crown is an annular protrusion that protrudes in the upper part of the annular base plate over the central hollow and which comprises the at least one inner upper surface in the surface of the crown facing downwardly the lower surface.

10. The wind turbine foundation of claim 8 wherein the dimension of the central hollow is established by the dimensions of the crown in such a way that the height of the foundation plus the distance between the supporting bottom surface and the lower surface minus the crown height defines the dimension.

11. The wind turbine foundation of claim 1 further comprising a perimeter wall reinforcement arranged in the central hollow between at least the supporting bottom surface and the lower surface.

12. The wind turbine foundation of claim 11 further comprising at least a sealing element located in the lower surface.

13. The wind turbine foundation of claim 12 wherein the at least one sealing element is disposed between the ground and the central hollow.

14. The wind turbine foundation of claim 13 wherein the sealing element is placed between the ground and the perimeter wall reinforcement, surrounding the perimeter wall reinforcement.

15. The wind turbine foundation of claim 1 further comprising at least a sealing element located in the lower surface.

16. A method for the construction of the wind turbine foundation for wind turbines of claim 1, the method comprising the following steps:
(i) digging a foundation trench in two levels where a first level corresponds to the supporting bottom surface of the annular base plate, wherein the supporting bottom surface transmits loads from the wind turbine foundation to a soil where the wind turbine foundation lies and a second level, which is deeper than the first level, corresponds to the lower surface;
(ii) pouring concrete on the surface of the second level of the ground to build the lower surface;
(iii) building a perimeter wall of the central hollow by pouring concrete in a first formwork from the second level below the first level until reaching the first level and filling a gap between an outer surface of the perimeter wall and the ground in order to have a continuous horizontal surface;
(iv) placing additional formworks and pouring concrete to build the rest of the foundation; and
(v) removing the first formwork and the additional formworks.

17. The method of claim 16 further comprising an intermediate step of placing a sealing element between steps of (i) digging and (ii) pouring.

18. The method of claim 16 further comprising an intermediate step of building a perimeter wall reinforcement and pouring concrete in the first formwork until reaching the first level between steps of (ii) pouring and (iii) formworking.

19. The wind turbine foundation of claim 1, wherein the central hollow extends substantially between an inner upper surface and the lower surface.

20. Wind turbine foundation comprising:
an annular base plate comprising
a supporting bottom surface of the annular base plate, wherein the supporting bottom surface transmits loads from the wind turbine foundation to a soil where the wind turbine foundation lies and defining a central hollow by an inner lateral surface of the annular base plate,
wherein the central hollow further comprises a lower surface arranged at a level lower than a level of the supporting bottom surface,
wherein the inner lateral surface extends below the supporting bottom surface to the lower surface,
wherein the central hollow is bounded by the inner lateral surface of the annular base plate, and
wherein the central hollow protrudes downwardly below the supporting bottom surface.

21. A method for the construction of the wind turbine foundation for wind turbines of claim 20, the method comprising the following steps:
(i) digging a foundation trench in two levels where a first level corresponds to the supporting bottom surface that transmits loads from the wind turbine foundation to a soil where the wind turbine foundation lies and a second level, which is deeper than the first level, corresponds to the lower surface;
(ii) pouring concrete on the surface of the second level of the ground to build the lower surface;
(iii) building a perimeter wall of the central hollow by pouring concrete in a first formwork from the second level below the first level until reaching the first level and filling a gap between an outer surface of the perimeter wall and the ground in order to have a continuous horizontal surface; and
(iv) placing additional formworks and pouring concrete to build the rest of the foundation;
(v) removing the first formwork and the additional formworks.

22. The wind turbine foundation of claim 20 wherein the inner lateral surface of the central hollow extends to a higher level than the supporting bottom surface and down below the level of the supporting bottom surface to the lower surface.

\* \* \* \* \*